United States Patent [19]

Harada

[11] Patent Number: 4,542,388

[45] Date of Patent: Sep. 17, 1985

[54] LIGHT OR HEAT OUTPUT STABILIZING SYSTEM

[75] Inventor: Shigeo Harada, Kaisei, Japan

[73] Assignee: Fuji Photo Film Co., Ltd., Japan

[21] Appl. No.: 575,698

[22] Filed: Jan. 31, 1984

[30] Foreign Application Priority Data

Feb. 1, 1983 [JP] Japan ................... 58-15136

[51] Int. Cl.⁴ .................................... G01D 15/14
[52] U.S. Cl. .................. 346/76 L; 250/236; 346/108; 358/292; 369/116
[58] Field of Search ............. 346/108, 76 L, 160; 358/292, 302; 369/116, 122; 250/236

[56] References Cited

U.S. PATENT DOCUMENTS

| | | | |
|---|---|---|---|
| 3,678,193 | 7/1972 | Yamamoto | 178/18 |
| 4,278,982 | 7/1981 | Cholet | 346/108 |
| 4,375,067 | 2/1983 | Kitamura | 346/108 X |
| 4,416,001 | 11/1983 | Ackerman | 250/236 X |
| 4,479,133 | 10/1984 | Shiozawa | 346/108 |

Primary Examiner—Joseph W. Hartary
Attorney, Agent, or Firm—Murray, Whisenhunt and Ferguson

[57] ABSTRACT

In an apparatus for recording an image by scanning a recording material with a light beam or a heat beam through rotation of a rotating body having at least one light source or heat source, the output of the light or heat source is controlled to obtain a sharp image free of scanning nonuniformity. A non-recording period on the recording material is detected by use of a combination of a light projector and a light receiver positioned in the rotating body with a light reflector secured near the rotating body, or a combination of a light receiver positioned in the rotating body with a light projector secured near the rotating body, or a combination of a magnetic sensor positioned in the rotating body with a magnet secured near the rotating body. The output of the light or heat source is stabilized by a stabilizing circuit within the detected non-recording period.

5 Claims, 9 Drawing Figures

LIGHT OR HEAT OUTPUT STABILIZING SYSTEM

BACKGROUND OF THE INVENTION

1. Field of the Invention

This invention relates to a light or heat output stabilizing system for stabilizing the light output of a light source or the heat output of a heat source in a light or heat beam scanning and recording apparatus for recording an image by scanning a scanning surface with a light beam emitted from the light source or a heat beam emitted from the heat source. This invention particularly relates to a light or heat output stabilizing system for stabilizing the light output of a light source such as a semiconductor laser or a light emitting diode or the heat output of a heat source such as a semiconductor laser or a light emitting diode in a recording apparatus which has at least one light source or at least one heat source mounted on a rotating body and which simultaneously carries out both modulation and deflection of the light beam emitted from the light source or the heat beam emitted from the heat source while the light source or the heat source is rotated together with the rotating body.

2. Description of the Prior Art

Laser beam sources can generate light beams exhibiting high spatial interference and a high spectral line brightness that cannot be obtained with the other types of light sources. Because of these advantages, laser beam sources are used for many optical read out and recording apparatuses. For example, the laser beam sources are used for read-out apparatuses such as in facsimile transmitters, automatic readers for label bar codes, and film flaw detectors. Laser beam sources are also used for recording apparatuses such as in video disc recorders and facsimile receivers. In the past, these laser-based apparatuses mainly employed gas lasers such as He-Ne, He-Cd and Ar lasers. However, gas laser beam sources are intrinsically large in size and, in addition, necessitate additional light scanners and light modulators for deflecting and modulating the light beam during scanning with the light beam. Consequently, such apparatuses using gas lasers are, in general, large in size and expensive. Thus, recently, semiconductor laser apparatuses which are small and exhibit high efficiency have come into increasingly wide use. One example of such an apparatus is that disclosed in Japanese Unexamined Patent Publication No. 57(1982)-151933 in which a semiconductor laser beam source is rotated to form linear scanning lines.

The optical rotational printer described in Japanese Unexamined Patent Publication No. 57(1982)-151933 is small in size and inexpensive, and yet can modulate and deflect the light beam without necessitating additional devices. However, this apparatus is disadvantageous in that, since the light output intensity of the semiconductor laser is markedly dependent on temperature, image nonuniformity readily arises on a recording material scanned with the laser beam emitted from the semiconductor laser when the ambient temperature fluctuates.

In order to eliminate the aforesaid drawback, it is necessary to stabilize the light output of the semiconductor laser. One approach to this is to directly control the temperature of the semiconductor laser. However, this method is not suitable since it complicates the mounting of the semiconductor laser and is difficult to implement because the space in the rotating body is limited.

On the other hand, in a system using a semiconductor laser for optical communication, a method wherein the light output is stabilized by controlling the bias current for superposition of a modulating signal is generally used. However, it is impossible to apply such a method to an apparatus for image recording including a DC component.

SUMMARY OF THE INVENTION

The primary object of the present invention is to provide a light output stabilizing system which stabilizes the light output of a semiconductor laser used as a light source in an apparatus for image recording also including a DC component.

Another object of the present invention is to provide a light output stabilizing system which is simple in construction and makes it possible to minimize the size of an image recording apparatus.

The above objects are accomplished by a light output stabilizing system for stabilizing the output of a light source for exposure such as a semiconductor laser or a light emitting diode positioned in a recording apparatus for recording an image in a recording material by scanning the recording material with a light beam through the rotation of a rotating body having the light source for exposure secured thereto, wherein the improvement comprises the provision of a means for detecting the non-recording period for which recording in said recording material by the light beam emitted from said light source for exposure is not conducted, and a light output stabilizing circuit for stabilizing the output of said light source for exposure within said non-recording period detected by said detecting means.

The present invention embraces not only the case where an image is recorded on a light-sensitive material by scanning with a light beam but also the case where an image is recorded on a heat-sensitive material by scanning with a beam of infrared rays. That is, the exposure to light and recording with light as described herein also embrace exposure to heat and recording with heat. For example, by "light source for exposure" is also meant a heat ray source such as an infrared ray laser, and by "recording material" is meant both light-sensitive material and heat-sensitive material.

In the light output stabilizing system in accordance with the present invention, since there is provided a detecting means for detecting the non-recording period on the recording material in the recording apparatus, it is possible to activate the light output stabilizing circuit only within the non-recording period on the basis of the output of the detecting means, which indicates the non-recording period. That is, it is possible to stabilize the light output within the non-recording period for which light modulation of the light beam is not required. Accordingly, point-by-point scanning on the recording material can be conducted by use of the stabilized light output, and it becomes possible to record a sharp image free of scanning nonuniformity even when the ambient temperature fluctuates. Further, since it it also possible to carry out stabilization of the light output each time the rotating body is rotated one turn, the accuracy of light output stabilization becomes markedly high. Control of stabilization need not always be conducted each time the rotating body is rotated one turn, but instead may be conducted once per several turns of the rotating body. Also, since the light output stabilizing system of the present invention can control even a DC component, the system is very advantageous in an image recording apparatus using a semiconductor laser. Furthermore, since the system is simple in construction and makes it possible to minimize the size of the recording apparatus, the system is very advantageous in practical use.

DESCRIPTION OF THE PREFERRED EMBODIMENTS

Figure 1:
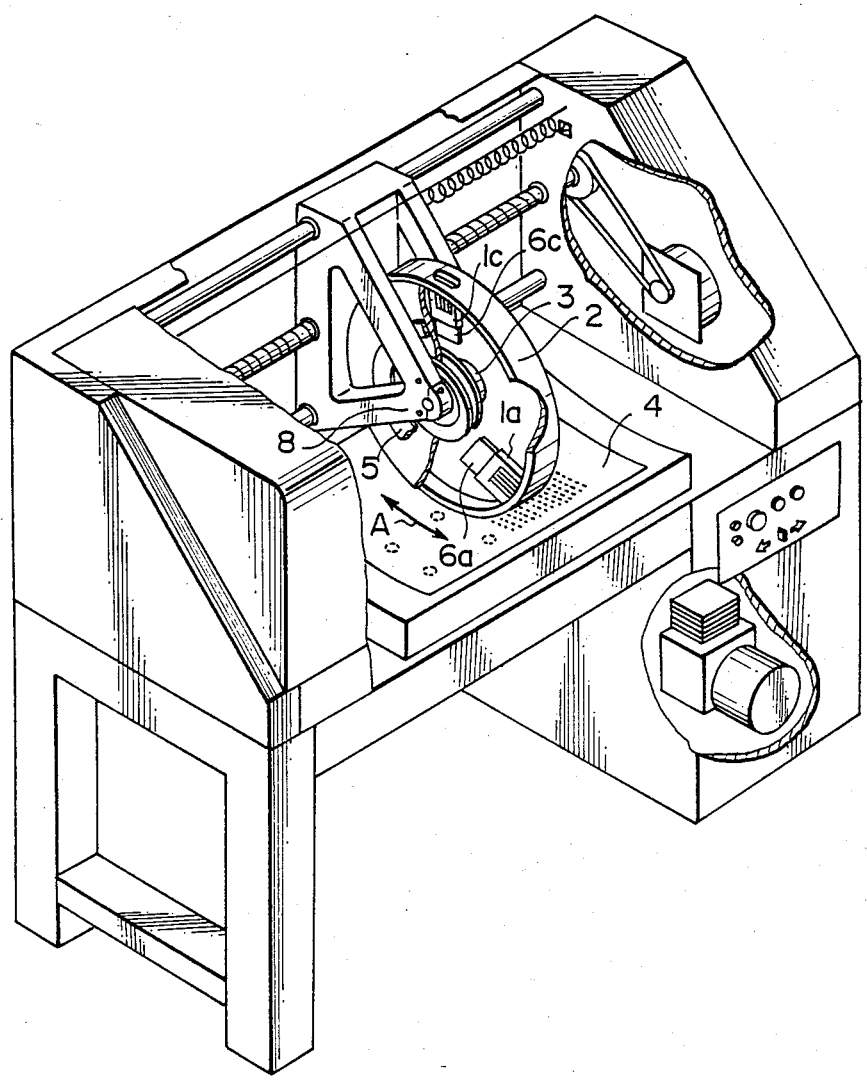
FIG. 1 is a schematic perspective view showing a recording apparatus in which an embodiment of the light output stabilizing system in accordance with the present invention is employed.

The present invention will hereinbelow be described in further detail with reference to the accompanying drawings.

Referring to FIGS. 1 through 4, the light output stabilizing system in accordance with the present invention comprises a rotating body 2 in which semiconductor laser beam sources 1a, 1b and 1c are positioned, a high-speed rotating motor 3 for rotating the rotating body 2, and a sheet-like recording material 4 positioned under the rotating body 2 along the circumference thereof. To the rotating body 2 are also secured stabilizing circuits 6a, 6b and 6c and reflection type optosensors 7a, 7b and 7c consisting of a light projecting element and a light receiving element in positions corresponding to the semiconductor laser beam sources 1a, 1b and 1c in the rotating body 2. A fixing member 8 is positioned near the rotating body 2, and a light reflecting plate 5 for reflecting the light beams emitted from the optosensors 7a, 7b and 7c is secured to the fixing member 8. The light reflecting plate 5 extends over a range corresponding to the non-recording period. Or, the portion of the light reflecting plate 5 corresponding to the non-recording period is colored white for reflecting light, and the other portion of the light reflecting plate 5 is colored black so that light is not reflected therefrom. The semiconductor laser beam sources 1a, 1b and 1c on the inner circumferential surface of the rotating body 2 are mounted for emitting laser beams outwardly at the time of recording. The recording material 4 is scanned with the laser beam emitted from each of the semiconductor laser beam sources 1a, 1b and 1c in the direction of the arrow A indicated in FIG. 1 as the rotating body 2 is rotated. The semiconductor laser beam sources 1a, 1b and 1c also emit laser beams toward the center of the rotating body 2, so that the light output of the semiconductor laser beam sources 1a, 1b and 1c can be monitored by use of photo diodes (not shown) positioned in the semiconductor laser beam sources 1a, 1b and 1c.

Figure 2:
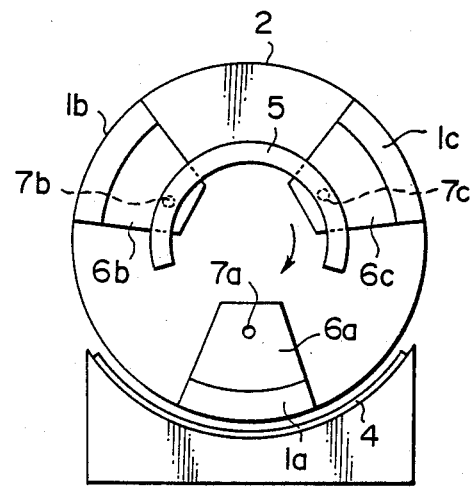
FIG. 2 is a front view showing a part of the recording apparatus of FIG. 1.
Figure 3:
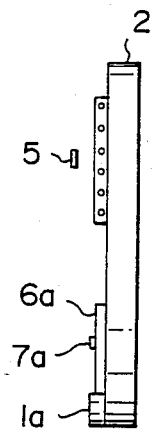
FIG. 3 is a side view of FIG. 2.
Figure 4:
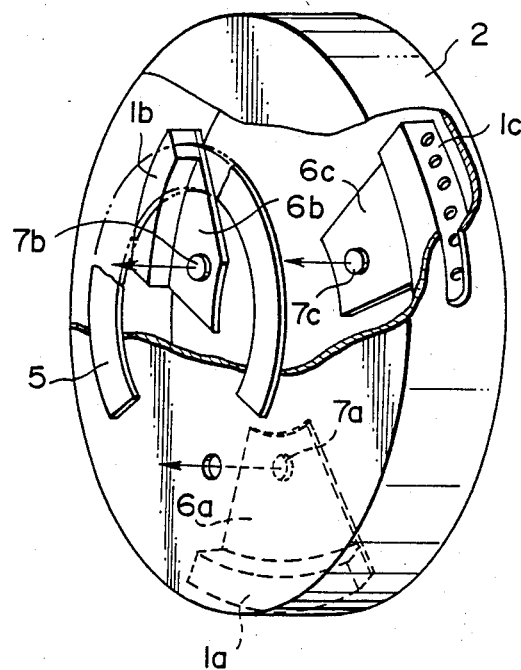
FIG. 4 is an enlarged perspective view of FIG. 2.

In FIG. 2, when the rotating body 2 is rotated and one of the semiconductor laser beam sources 1a, 1b and 1c comes to the recording position in which the laser beam emitted from the semiconductor laser beam source 1a, 1b or 1c impinges upon the recording material 4, the output of the laser beam emitted from the semiconductor laser beam source 1a, 1b or 1c is maintained at a predetermined level, and modulated with an image signal to record an image in the recording material 4. In this manner, as the rotating body 2 is rotated, the recording material 4 is scanned with the modulated laser beam and the image is recorded therein. When the rotating body 2 is further rotated and the aforesaid one of the semiconductor laser beam sources 1a, 1b and 1c comes to the non-recording position in which the laser beam emitted from the semiconductor laser beam source 1a, 1b or 1c does not impinge upon the recording material 4, a light beam emitted from the light projecting element of the corresponding optosensor 7a, 7b or 7c is reflected by the light reflecting plate 5 and received by the light receiving element of the corresponding optosensor 7a, 7b or 7c. When the reflected light beam is detected by the light receiving element, a high level signal is generated by the corresponding optosensor 7a, 7b or 7c and sent to the corresponding stabilizing circuit 6a, 6b or 6c. Upon receiving the high level signal, the stabilizing circuit 6a, 6b or 6c starts controlling the light output of the corresponding semiconductor laser beam source 1a, 1b or 1c.

Thereafter, the rotating body 2 is further rotated and the aforesaid one of the semiconductor laser beam sources 1a, 1b and 1c again comes to the recording position, at which position the light reflecting plate 5 for reflecting the light beams emitted from the light projecting elements of the optosensors 7a, 7b and 7c is not present. Therefore, the light beam is no more reflected by the light reflecting plate 5 nor detected by the corresponding optosensor 7a, 7b or 7c. At this time, the optosensor 7a, 7b or 7c sends a low level signal to the corresponding stabilizing circuit 6a, 6b or 6c. Upon receiving the low level signal, the stabilizing circuit 6a, 6b or 6c stops controlling the light output of the corresponding semiconductor laser beam source 1a, 1b or 1c and maintains the drive voltage prevailing at this time. On the basis of this maintained drive voltage, a laser beam can be emitted from the semiconductor laser beam source 1a, 1b or 1c at the recording step.

Accordingly, in this embodiment, it is possible to detect the non-recording period each time the rotating body 2 is rotated one turn and to stabilize the light output of each of the semiconductor laser beam sources 1a, 1b and 1c within the non-recording period. In the recording period, it is possible to record an image in the recording material 4 by use of the light beam of the stabilized level. Therefore, image nonuniformity does not arise in the recording material 4 even when the ambient temperature fluctuates.

Figure 5:
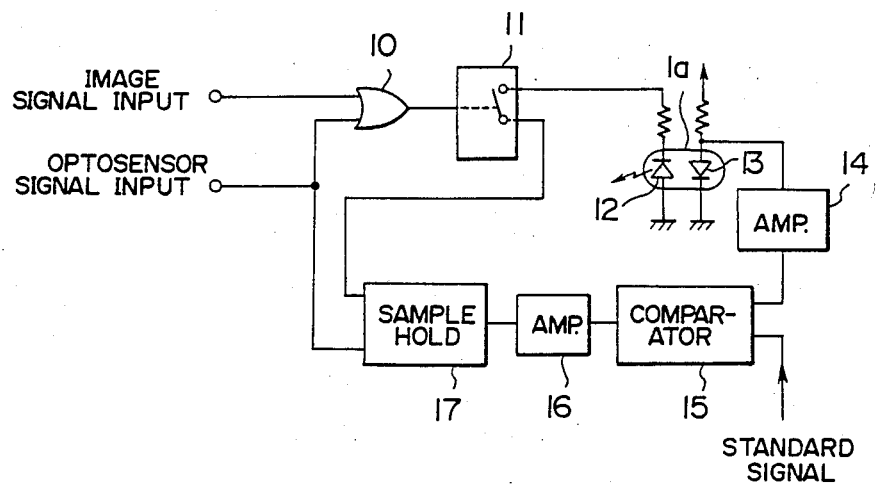
FIG. 5 is a block diagram showing an embodiment of the light output stabilizing circuit in the system of the present invention.

FIG. 5 shows an embodiment of the light output stabilizing circuit in the system of the present invention. When a high level signal is sent from the corresponding optosensor 7a, 7b or 7c, the gate of a NOR gate circuit 10 is closed and, as a result, a switching circuit 11 is closed. Thus a laser beam is emitted from a semiconductor laser diode 12 (which corresponds to the aforesaid semiconductor laser beam source 1a, 1b or 1c), and received by a photo diode 13 built in the semiconductor of the laser diode 12 together therewith. The photo diode 13 generates an electric signal of a level corresponding to the light intensity of the laser beam emitted from the semiconductor laser diode 12.

The electric signal generated by the photo diode 13 is amplified by an amplifying circuit 14, and compared with a standard signal in a comparator 15. The comparator 15 generates a signal indicating the difference between the aforesaid amplified signal and the standard signal. The difference signal is amplified by an amplifying circuit 16 and entered into a sample holding circuit 17. On the basis of the amplified difference signal, a voltage value which has been stored in the sample holding circuit 17 is adjusted. The voltage value thus adjusted is then stored in the sample holding circuit 17. Then, a drive voltage of a level equal to the adjusted voltage value is generated by the sample holding circuit 17 and fed back to the semiconductor laser diode 12, thereby controlling the laser beam output of the semiconductor laser diode 12 at a predetermined value. When the rotating body 2 is rotated and the optosensor 7a, 7b or 7c corresponding to the aforesaid light output stabilizing circuit comes to the recording position in which the light beam emitted from the light projecting element of the optosensor 7a, 7b or 7c is not reflected by the light reflecting plate 5, a low level signal is generated by the optosensor 7a, 7b or 7c and entered to the sample holding circuit 17. By the low level signal, the gate of the sample holding circuit 17 is closed, and the voltage in the sample holding circuit 17 is maintained at the drive voltage prevailing therein at this time. At the recording step, the drive voltage maintained in the sample holding circuit 17 is switched by the image signal and applied to the semiconductor laser diode 12. In this manner, it is possible to adjust the peak value of the light output of the semiconductor laser diode 12 to a predetermined value.

The light output stabilizing circuits employed in the aforesaid embodiment have a simple construction as described above. Therefore, the light output stabilizing circuits can be housed in a small space in the rotating body 2 and make it possible to minimize the size of the apparatus. Further, since the gates of the light output stabilizing circuits are switched by the signals of the optosensors 7a, 7b and 7c indicating the non-recording period, stabilization of the light output can be conducted within the non-recording period for which light modulation of the light output is not necessary. Also, since the system of the present invention can control even a DC component, the system is very advantageous for an image recording apparatus using a semiconductor laser.

Figure 6:
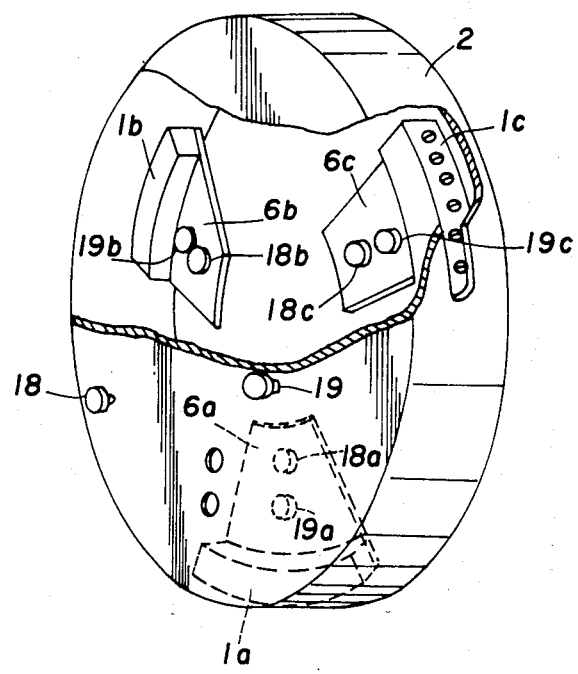
FIG. 6 is an enlarged perspective view of FIG. 2 utilizing another embodiment of the invention.
Figure 7:
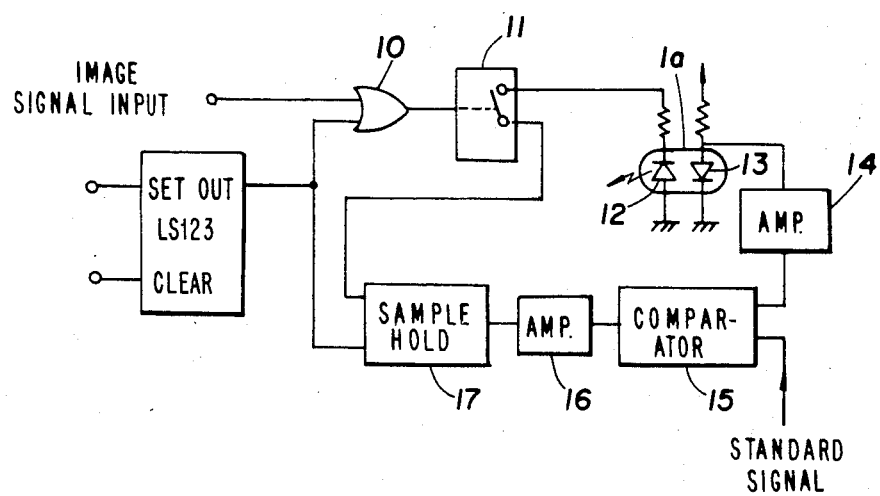
FIG. 7 is a block diagram showing the light output stabilizing circuit for the embodiment of FIG. 6.

Instead of using the non-recording period detecting means as described above, it is also possible to install a group of light projectors such as light emitting diodes in the position corresponding to that of the light reflecting plate 5 near the rotating body 2 employed in the aforesaid embodiment along the circumference of the rotating body 2. In this case, only light receivers such as photo transistors 18a, 18b, 18c, 19a, 19b and 19c are positioned in the rotating body 2 so that the light receivers can receive light beams emitted from the light projectors only within the non-recording period. The light projectors 18 and 19 may be positioned contiguously or, as shown in FIG. 6, in spaced relation to one another in positions corresponding to the non-recording period in the circumferential direction of the rotating body 2. However, as shown in FIG. 7 when the light projectors are positioned in spaced relation to one another, it is necessary e.g. to install a retriggerable multivibrator such as an LS123 at the first stage of the portion for receiving the signal from the optosensor in the above-described light output stabilizing circuit, and to select the time constant defined by the outside resistance of the multivibrator and the capacity of the capacitor, so that a high level signal is continuously generated by the multivibrator during the non-recording period to maintain the switching circuit 11 closed during the non-recording period.

Figure 8:
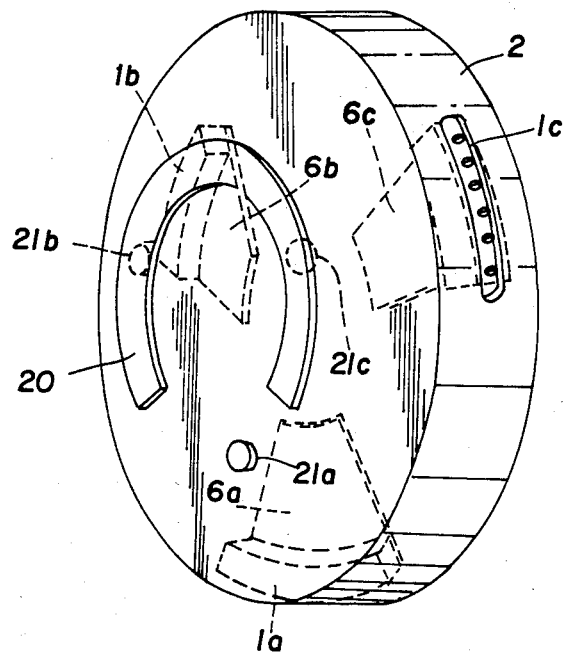
FIG. 8 is an enlarged perspective view of FIG. 2 utilizing a further embodiment of the invention.
Figure 9:
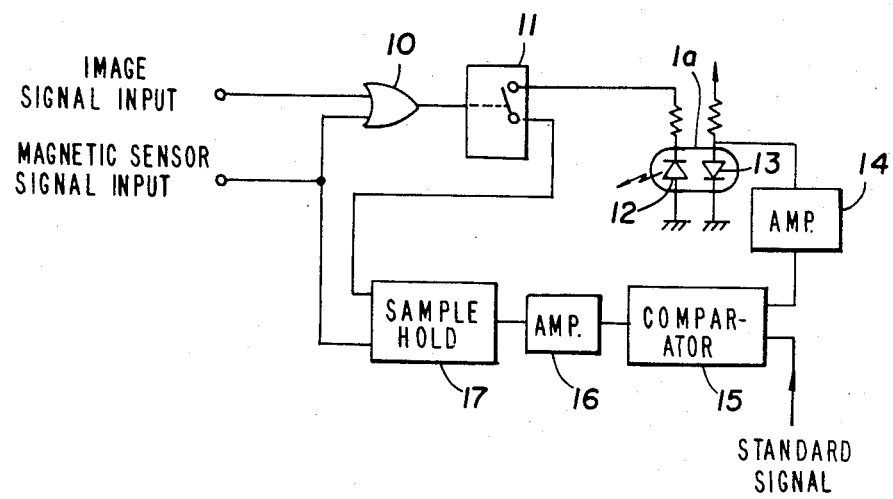
FIG. 9 is a block diagram showing the light output stabilizing circuit for the embodiment of FIG. 8.

Further, as shown in FIGS. 8 and 9 the aforesaid light projectors may be replaced by mangets 20, and the aforesaid light receivers may be replaced by magnetic sensors, 21a, 21b and 21c so that the magnetic sensors detect the magnetic field of the magnets only during the non-recording period.

Thus any type of detecting means may be employed insofar as it has a simple construction and can detect the non-recording position under non-contacting conditions and send the detection signal to the light output stabilizing circuit.

I claim:

1. A light or heat output stabilizing system for stabilizing the output of a light source for exposure or a heat source for exposure in a recording apparatus for recording an image in a light-sensitive material or a heat-sensitive material by scanning the light-sensitive material with a light beam or by scanning the heat-sensitive material with a heat beam through the rotation of a rotating body provided with at least one light source for exposure or at least one heat source for exposure, wherein the improvement comprises the provision of a means for detecting the non-recording period for which recording in said light-sensitive material by the light beam emitted from said light source for exposure or recording in said heat-sensitive material by the heat beam emitted from said heat source for exposure is not conducted, and a stabilizing circuit for stabilizing the output of said light source for exposure or said heat source for exposure within said non-recording period detected by said detecting means.

2. A system as defined in claim 1 wherein said detecting means comprises a light projector and a light receiver positioned in said rotating body, and a light reflector secured in a predetermined position near said rotating body so as to receive a light beam emitted from said light projector and reflect said light beam to said light receiver.

3. A system as defined in claim 1 wherein said detecting means comprises a light receiver positioned in said rotating body and a light projector secured in a predetermined position near said rotating body.

4. A system as defined in claim 1 wherein said detecting means comprises a magnetic sensor positioned in said rotating body and a magnet secured in a predetermined position near said rotating body.

5. A system as defined in any of claims 1 to 4 wherein said light source for exposure or said heat source for exposure is a semiconductor laser.

* * * * *